This invention relates generally to a device for determining the attitude of flight of an air vehicle, for example, the angles of pitch and yaw and, more particularly, to an acoustic probe for determining these angles.

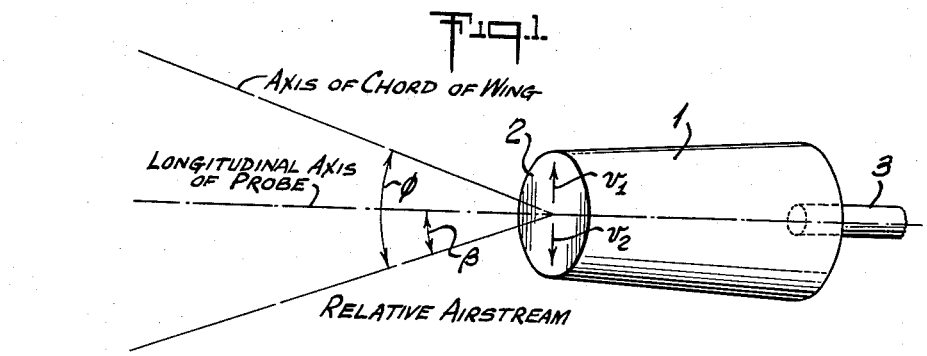
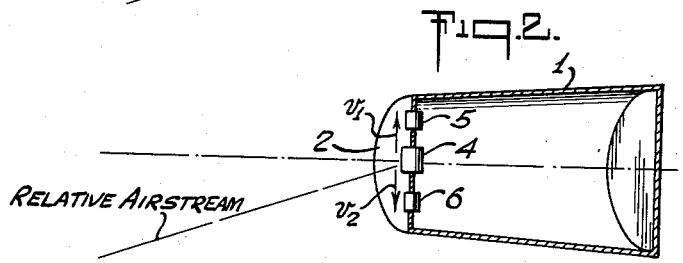
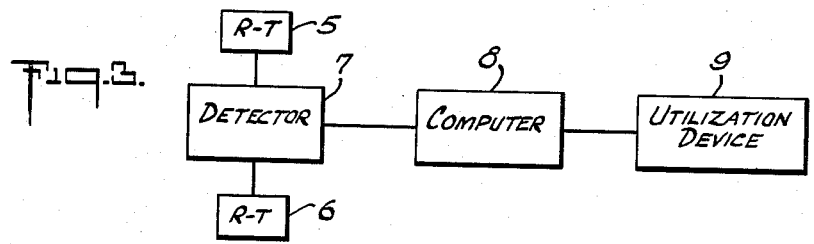
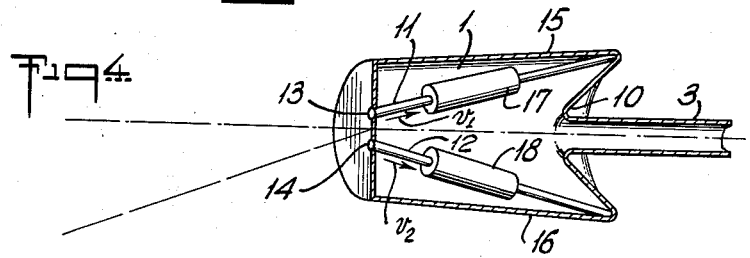
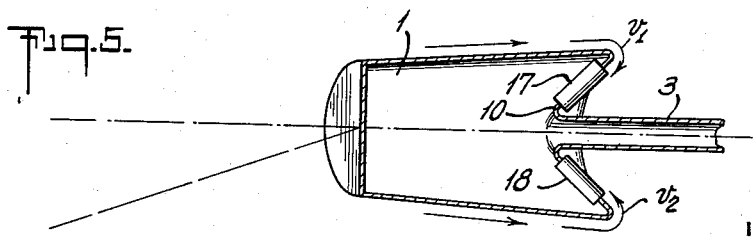
INVENTOR
GEORG E. KNAUSENBERGER 3,120,756
ACOUSTIC PROBE
Georg E. Knausenberger, U.S. Air Force, assignor to HRB-Singer, Inc., State College, Pa., a corporation of Delaware
Filed Aug. 3, 1960, Ser. No. 47,300
6 Claims. (Cl. 73—180)

In controlling the attitude of flight of an air vehicle, it has been the common practice to utilize gyroscopic means. This method has the disadvantage that it is necessary, manually or automatically, to cage the instrument for correction of gyroscopic precession. Further, use of the gyroscope has the additional disadvantage of controlling the attitude of flight relative to the axis of the earth instead of the axis of the relative airstream, which is more efficient.

Devices have also been proposed which utilize the relative pressures developed in the airstream to indicate the angles of pitch and yaw, and to provide correction information for controlling the flight attitude of the air vehicle. These devices are generally of the pitot tube or mechanical vane type. While such pressure sensitive devices have operated satisfactorily in conventional aircraft, they suffer certain shortcomings on aircraft of higher speeds. Since aircraft design is tending towards higher speeds, pressure sensitive devices are becoming obsolescent. The pressure sensitive devices are also affected by adverse conditions of weather, such as icing and dust.

Accordingly, it is a primary object of the invention to provide a probe for determining angles of pitch and yaw relative to the axis of the airstream; the novel probe being substantially unaffected by atmospheric or flight conditions and effective over a wide range of speeds.

In accordance with an aspect of the invention, there is provided a probe affixed to an air vehicle so that its axis is disposed parallel to the longitudinal axis of the vehicle, enabling it to encounter the oncoming airstream as the vehicle moves in its flight path. The airstream has a particular flow velocity which may be resolved into vector components. The invention is characterized by pairs of sound propagating and receiving units located at diametrically opposite points in the paths of airstream flow such as disclosed, for example, in U.S. Patent Number 2,534,712, which issued on December 19, 1950, to J. W. Gray for an "Apparatus for Measuring Airspeed," and in an article entitled "Electronic Flow Meter System," by H. P. Kalmus, which was published in the March 1954 issue of The Review of Scientific Instruments. In accordance with this invention the apparatus disclosed in said publications is used to measure the velocity of the vector components. As the airstream effectively breaks down into its vector components, the frequency of the sonic transmissions is affected in accordance with the orientation of the probe in the airstream. These effects on the sonic frequency are detected at each pair of receivers, and a comparative measurement is made of the signals to indicate the angles of pitch and yaw, which are functions of the changes in sonic frequency.

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a schematic representation of a probe in side elevation, illustrating the physical principles necessary for ascertaining the angle of attack;

FIG. 2 is a sectional view of FIG. 1 and shows the sonic means mounted in the probe for ascertaining the angle of attack;

FIG. 3 is a simplified block diagram showing an electrical system utilizing the receiver-transducers of the probe of this invention;

FIG. 4 is a sectional view of a probe showing a modification of the device for ascertaining the angle of attack; and FIG. 5 is a sectional view of a probe showing a further embodiment of the device for ascertaining the angle of attack.

It is, of course, well known that as an aircraft or missile travels through the atmosphere it encounters the oncoming airstream, which has a certain velocity of flow. When the airstream strikes the aircraft or missile it breaks down into its vector components and passes over the obstrucing element of the air vehicle by seeking the path of least pressure resistance. In FIG. 1, this condition is depicted as occurring when the airstream strikes a substantially cylindrical probe 1, having a flat face 2; the probe being mounted on the end of an arm 3 which is carried by an aircraft or other space vehicle in flight. The quantity of flow velocity striking the flat face 2 of the probe 1 will be constant for a particular set of aerodynamic conditions and for a particular probe configuration. The vector components of the flow velocity will vary, however, as the orientation of the probe changes with respect to the axis of the relative airstream. It is this change of the relative relationships of the vector components, which are shown as the vectors $v1$ and $v2$ moving across the flat face of the probe in a transverse manner, which is utilized to indicate that aspect of flight performance known as angle of attack or pitch angle.

The angle of attack of an air vehicle is the angle between the axis of the chord of the wing and the relative airstream encountered by the aircraft in flight, or, as more particularly denoted in FIG. 1, the angle $\phi$. The angle $\beta$ is shown as being the angle between the longitudinal axis of the probe 1 and the relative airstream. The disposition of the probe 1 with respect to the relative airstream will, of course, be dependent on the angle of attack. If it is assumed that the axis of the chord of the wing is the same as the longitudinal axis of the probe, or if it is not, the difference can be computed; the angle $\beta$ can then be made to indicate the actual angle of attack. The angle $\beta$, therefore, can be a direct function of the relative relationships of the vector components $v1$ and $v2$ of the flow velocity.

If the flow velocity components $v1$ and $v2$ are equal, then the axis of the probe is coincident with the axis of the airstream and the angle $\beta$, the angle of attack, is zero. On the other hand, if the components are unequal, there is an angle of inclination with respect to the axis of the probe which indicates that the air vehicle is pitching with respect to its velocity vector.

These physical principles of aerodynamics are utilized in the application illustrated in FIG. 2, showing one embodiment of the invention. In this embodiment means are provided to measure acoustic parameters which are converted to indicate the angle of attack. A sonic or ultrasonic generator and propagator 4 is shown surface-mounted at a central point on the face 2 of the probe 1. Receiving transducers 5 and 6 are surface-mounted equidistantly above and below the propagator 4, in diametrically opposed relationship in a vertical plane through the center of the probe. The propagating device 4 radiates sonic or ultrasonic energy in pulses toward the receivers 5 and 6. A feedback circuit is provided from each receiver to the propagating device. When a pulse reaches the receiver, the feedback signal triggers another pulse, thus providing a continuous train of pulses whose frequency depends on the sonic transit time between the propagating device and the receiver, as discussed in said U.S. Patent 2,534,712.

The face of the probe is simultaneously subjected to the flow of the velocity of the oncoming airstream. The airstream breaks down into its vector components of velocity. The vector components are dependent on the orientation of the probe in the airstream, and according to the path of travel of the airstream across the face of the probe, the effect of the flow velocity will be additive or subtractive to the sonic energy velocity. If the vector components of flow velocity are equal, the pulse frequency will be the same at both receiver-transducers. But if the vector components of flow velocity are unequal, the pulse frequencies will differ by an amount proportional to the difference of flow velocity, which in turn is related to the angle between the axis of the probe and the direction of the airstream. Thus the received signal can be measured at the receiver-transducers 5 and 6 to obtain the angle of attack.

The signals received at transducers 5 and 6 are detected and a comparative measurement of them is made in a conventional phase or frequency detector circuit 7. For example, a ring modulator may be employed as a phase sensitive detector, or Lissajous figures may be displayed on an oscilloscope and evaluated. If the aircraft is pitching, the frequency of the propagated signal at one transducer will be shifted in a direction opposite to the frequency shift at the other transducer. Knowing the airstream velocity permits computation of the angle $\beta$ by measuring the frequency difference. The direction of shift (polarity) also indicates the vertical attitude of the craft.

As previously stated, when the velocity components $v1$ and $v2$ are equal, the axis of the probe coincides with the axis of the relative airstream and the frequency of the signals received by transducers 5 and 6 will be equal. Equal frequencies in the received signals are an indication, therefore, that the probe is not pitching, i.e., that $\beta=0$.

The pitch angle may be directly obtained by feeding the detected output into a computer 8 into which other data such as airstream velocity is also fed. This technique is, of course, conventional and forms no part of the invention. The information may be displayed directly in the cockpit of a manned aircraft for the information of the pilot, or it may provide a control signal for a pitch control unit of an automatic pilot in a missile or aircraft. The information may also be converted to another parameter of flight performance, such as vehicle velocity or Mach number. This aspect of operation is suggested in block form as a utilization device 9.

A second embodiment of this invention, shown in FIG. 4, determines velocity measurement in the pair of channels located in the probe. A flat-faced probe 1 having a cusp-shaped rear end 10 is carried by an arm 3 mounted on an air vehicle (not shown). Upper and lower channels, 11 and 12, are provided through the probe which extend from pressure points 13 and 14, respectively; the pressure points being slightly displaced from the center of the forward face of the flat-faced probe 1. The channels extend divergingly towards the cusp-shaped rear end 10 of the probe 1 adjacent the upper and lower edges 15 and 16 thereof. The position of the flow channels assures a maximum drop from the input to the output without any back pressure. The path of the air-stream, after breaking up into its vector components $v1$ and $v2$ is through the channels 11 and 12. The channels pass through corresponding receiver-transmitter housings 17 and 18, each of which contain a sonic transmitter located on the input side of the housing and a sonic receiver located on the output side of the housing. The transmitters propagate sonic energy through the respective channels towards the receivers. As in the previous embodiment, the frequency of the sonic energy is modified by the velocity of air flow through the channels. The resultant wave is sensed by the receivers to provide signals for a comparative measurement.

While a flat-faced probe has been described in the second embodiment of the invention, for covering a greater range of speed, it is to be understood that for greater accuracy of measurement an ogive or pointed nose can be used on the probe.

Referring now to FIG. 5, a third version of the invention is illustrated. In this embodiment, a probe 1, which may take the form of a cylinder, a cone or a frustoconical shape, having a cusp-shaped rear end 10, is carried by an arm 3 mounted to an air vehicle. The path of flow of the components of the airstream is around the probe to the cusp-shaped rear end. Sonic transmitter and receiver units 17 and 18 are mounted such that the sonic transmissions will be interfered with by the flow velocity components of the airstream. Measurements are then made, as described above, to ascertain the relative effects of the components $v1$ and $v2$ on the sonic transmissions to provide a comparative measurement which can be converted to the value of the angle of attack. However, 90° displacement is not a critical factor in the operation.

The foregoing description of the various embodiments of this invention has been confined to means for ascertaining the value of the pitch angle of an air vehicle by measuring certain acoustic parameters of locally propagated sonic energy, such as the phase and frequency. At lesser velocities the change in phase is greater than the change in frequency, and therefore phase detection is more desirable at the slower speeds.

The yaw component of flight may also be determined by using the same type of system. The sonic transmissions in the first embodiment would be in a horizontal plane through the center of the probe, while in the second version the channels containing the sonic sensing units would extend toward the sides of the probe in a horizontal plane through its center, and in the third embodiment the sending units would be mounted in diametrically opposing relationship to the right and left sides of the cusp-shaped rear end of the probe.

Furthermore, this invention contemplates the simultaneous measurement of both the pitch and yaw components of the flight attitude of an air vehicle. This is accomplished by providing two such systems, as described above, with independent detecting circuits to provide the relative measurements of the flow components of the airstream and thus the information necessary for ascertaining the pitch angle and the yaw angle.

While the foregoing description sets forth the principles of the invention in connection with specific apparatus, it is to be understood that this description is made only by way of example and not as a limitation of the scope of the invention as set forth in the objects thereof and in the accompanying claims.

I claim:

1. A device for determining the attitude of an air vehicle in flight comprising a probe for dividing an oncoming airstream into two velocity components, acoustic energy propagating means for generating sonic energy of pulses in the two velocity components of the airstream, a first transducer responsive to the pulses transmitted in one of the two velocity components of the airstream, a second transducer responsive to the pulses transmitted in the other of the two velocity components of the airstream, and means for computing the phase difference of the pulses received by the two transducers to determine the attitude of the probe with respect to said airstream.

2. A device for determining the attitude of an air vehicle in flight according to claim 1, wherein the probe has a blunt surface for intercepting the airstream; the energy propagating means and transducers are located on the face of the probe, the propagating means being located centrally and the transducers being spaced radially from said propagator.

3. A device for determining the attitude of an air vehicle in flight according to claim 1, wherein the probe is provided with a pair of channels as the flow paths for the two velocity components of the airstream, each of said channels originating in the front surface of the probe and diverging from the other channel to the outer surface of the rear end of the probe as said channels extend back through the probe, and said energy propagating means comprising an acoustical propagator in each of said channels.

4. A device for determining the attitude of an air vehicle in flight according to claim 1, wherein said probe comprises a cusp-shaped rear end, and said energy propagating means and transducers being located on the cusp-shaped rear end of the probe.

5. A device for determining the angle of attack of an air vehicle in flight comprising a probe for dividing an oncoming airstream into two vertical velocity components, acoustical energy propagating means for generating sonic energy pulses in the two velocity components of the airstream, a first transducer responsive to the pulses transmitted in one of the two velocity components of the airstream and positioned above the longitudinal axis of said probe in a vertical plane through said axis, a second transducer responsive to the pulses transmitted in the other of the two velocity components of the airstream and positioned below the longitudinal axis of said probe diametrically opposite to said first transducer, and means for computing the phase difference of the pulses received by the two transducers to determine the angle of attack of said air vehicle with respect to said airstream.

6. A device for determining the yaw of an air vehicle in flight comprising a probe for dividing an oncoming airstream into two horizontal velocity components, acoustical energy propagating means for generating sonic energy pulses in the two velocity components of the airstream, a first transducer responsive to the pulses transmitted in one of the two velocity components of the airstream and positioned to one side of the longitudinal axis of said probe in a horizontal plane through longitudinal axis, a second transducer responsive to the pulses transmitted in the other of the two velocity components of the airstream and positioned to the other side of the longitudinal axis of said probe diametrically opposite to said first transducer, and means for computing the phase of the pulses received by the two transducers to determine the yaw of said air vehicle with respect to said airstream.

References Cited in the file of this patent
UNITED STATES PATENTS

| | | |
|---|---|---|
| 2,274,262 | Wolff | Feb. 24, 1942 |
| 2,512,278 | Jones | June 20, 1950 |
| 2,534,712 | Gray | Dec. 19, 1950 |
| 2,821,083 | Seliger | Jan. 28, 1958 |

OTHER REFERENCES

Wood: Acoustics, published by Interscience Publishers, Inc. (New York), 1941 (page 325 relied on). (Copy in Div. 44.)